United States Patent [19]

Fransson et al.

[11] Patent Number: 4,934,954
[45] Date of Patent: Jun. 19, 1990

[54] ELECTRICAL CONTACT UNIT

[75] Inventors: Rolf Göran Fransson, Angered; Bertil E. Jansson, deceased, late of Jönköping, both of Sweden, by Magnus Jansson, administrator

[73] Assignee: Victor Hasselblad Aktiebolag, Gothenburg, Sweden

[21] Appl. No.: 385,254

[22] Filed: Jul. 25, 1989

[30] Foreign Application Priority Data

Aug. 8, 1988 [SE] Sweden .................................. 8802839

[51] Int. Cl.$^5$ ...................... H01R 23/66; H01R 13/74
[52] U.S. Cl. .................................... 439/131; 200/51.1; 354/288; 439/188; 439/289; 439/564; 439/914; 439/499
[58] Field of Search .................. 439/77, 131, 151, 188, 439/289, 564, 378, 914, 499; 200/51.1; 354/21, 275, 285, 288, 289.12

[56] References Cited

U.S. PATENT DOCUMENTS

| | | | |
|---|---|---|---|
| 4,417,798 | 11/1983 | Ohkura et al. | 354/286 |
| 4,457,609 | 7/1984 | Tomino et al. | 354/286 |
| 4,637,704 | 1/1987 | Ishimura et al. | 354/286 |
| 4,743,829 | 5/1988 | Fenne et al. | 439/131 |

Primary Examiner—Neil Abrams
Attorney, Agent, or Firm—Poms, Smith, Lande & Rose

[57] ABSTRACT

An electrical contact unit is provided for a first main member, which has a mainly planar first mounting surface, and for a second main member, which has a mainly planar second mounting surface and is mountable on the first main member. The first mounting surface and the second mounting surface lie against each other when the second main member is mounted on the first main member. The first main member comprises a male contact member, which has an outer surface and carries electrically conductive male contacts, and a maneuvering pin, which extends out from the outer surface. By means of guide elements, the male contact member is mounted in the first main member for motion generally perpendicular to the first mounting surface between an outer position and an inner position. When the male contact member is in the inner position, the outer surface is withdrawn relative to the first mounting surface, the male contacts are in a position of maximum extension, and the manuevering pin is in an innermost position and lies against the second mounting surface. When the second main member is not mounted on the first main member, the male contact emmber assumes the outer position, each male contact assumes the position of maximum extension, and the maneuvering pin assumes the outermost position.

10 Claims, 5 Drawing Sheets

ELECTRICAL CONTACT UNIT

FIELD OF THE INVENTION

The present invention relates to an electrical contact unit for electrically connecting a first main member, which has a generally planar first mounting surface, with a second main member, which has a generally planar second mounting surface and which is mountable on the first main member.

BACKGROUND OF THE INVENTION

Every time electrical current is to be transferred between two separate members of a mechanical device, some form of contact unit is required. When the two members do not need to be in physical contact with each other, electrical contact is often made by means of an electrical cord, whose one end is electrically connected with the one member and whose other end is provided with a plug. The second member is provided with a socket, into which the plug fits. The plug constitutes a male member, with pins which extend from its body. The socket constitutes a corresponding female member.

When the two members must be in physical contact with each other, for example when the second member is to be mounted on the first, this type of electrical contact is often unsatisfactory, especially if the mounting surfaces are mainly flat. Although the electrical cord could be led from a side surface of the first member to a socket in a side surface of the second member, this leads to an extra work step; furthermore, the cord may be inadvertantly pulled out or otherwise damaged.

A particular problem arises if the second member is not provided with a socket. This may for example be the case when an old accessory, which does not include or use electrical and electronic components, is to be mounted on a new main member which does. This is so in the case of modern system cameras which have interchangeable film magazines when one wishes to mount a magazine without an electrical socket, i.e., with no need for an electrical contact, onto a camera housing, which is equipped with electronic and electrical contact devices. In such case, the cord will either hang loose or its contacts or connection points with the main member will remain unprotected.

One way to avoid the disadvantages of a cord connection is to arrange male and female contacts respectively in the camera housing itself and the magazine itself. When the magazine is mounted on the housing, the male contacts are carefully guided into the female contacts. In addition to the need for great care in order to avoid damaging the male contacts, this solution suffers from another significant disadvantage. Since the contact pins extend from the mounting surface, if the male contacts are securely mounted in the camera housing, it is impossible to mount a magazine which does not have holes, i.e. female contacts, into which the pins may fit. This precludes the use of old magazines, which do not include electronics, or of other magazines which are not provided with receiving female contacts or holes.

One known to solution to this problem is to mount the pins of the male contact member in holes in the camera housing, whereby springs bias the pins outward so that they extend out from the mounting surface of the camera housing. When a magazine without receiving female contacts is mounted on the camera housing, the pins are pushed into the camera housing by the flat mounting surface of the magazine. The disadvantage of this solution is that the ends of the pins will always be pressed against the mounting surface of the magazine. Since this mounting surface is not a contact surface, the tips of the pins, which constitute the contact surfaces of the pins, easily becomes soiled and are subjected to unnecessary wear. It is therefore advantageous to have a male contact member which makes it possible for the contact pins to retract when an accessory lacking receiving female contacts is mounted on the main member.

U.S. patent application Ser. No. 07/244,264 describes a contact cradle in which contact pins are pushed out of the way when a supporting surface on the accessory—in the described case a camera lens—presses against a roller in the contact cradle. When the lens approaches a contact position the roller rolls into a recess in the supporting surface of the lens. Under the influence of a spring, the cradle then rotates about an axle so that the contact pins are pressed against the corresponding female contacts in the lens. This contact arrangement is primarily intended for use with accessories which are mounted on a main member by means of a rotational movement. The contact cradle itself also moves between its different positions by rotation. It furthermore requires rollers, so that the contact cradle must be at least as wide as the roller. Finally, this contact arrangement has no switch or contact by means of which it is possible for the electronic system of the camera to determine whether a mounted lens is provided for electrical contact with the camera housing.

Accordingly, one object of the present invention it to provide an electrical contact unit by means of which two members may be electrically connected, and whose contact elements ensure good electrical contact when both the members are provided for electrical connection, whereas the male contacts are securely retracted in order to avoid damage and wear when the main members are not so provided. Another object is to arrange the contact unit so that it is possible to determine whether an accessory is mounted on the main member.

SUMMARY OF THE INVENTION

The objects are achieved by means of the present contact unit which is characterized in that:

the first mounting surface and the second mounting surface lie against each other when the second main member is mounted on the first main member;

the first main member comprises a male contact member, which has an outer surface and carries electrically conductive male contacts and a maneuvering means, which extends out from the outer surface and has an innermost and an outermost position;

the male contact member is mounted by means of guide means in the first main member for motion mainly perpendicular to the first mounting surface between an outer position and an inner position;

when the male contact member is in the inner position, the outer surface is retracted relative to the first mounting surface, the male contacts are in a position of maximum extension, and the maneuver means is in the innermost position and lies against a second mounting surface; and when the second main member is not mounted on the first main member, the male contact member assumes the outer position, each male contact assumes the position of maximum extension and the maneuver means assumes the outermost position.

DESCRIPTION OF THE DRAWINGS

A preferred embodiment of the contact unit according to the present invention will now be described with reference to the accompanying drawings, in which.

The FIGS. 4–11 are on a greatly enlarged scale.

DETAILED DESCRIPTION

In order to facilitate the description of the preferred embodiment of the invention it is assumed below that the contact unit according to the invention is to be used to provide electrical contact between a camera housing and a film magazine, which is to be mounted on the camera housing. As will become apparent below, however, the present contact unit may be used to equal advantage in all cases where two parts with mainly flat mounting surfaces are to be electrically coupled, and where mounting of the one part onto the other is done by means of a motion which is mainly perpendicular to the mounting surfaces.

Figure 1:
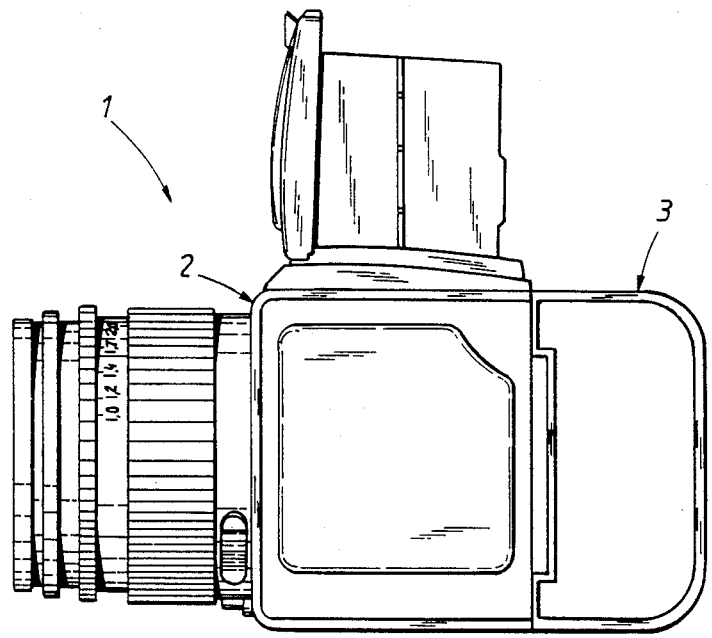
FIG. 1 is a side view of a camera.

FIG. 1 shows a camera, which includes a camera housing 2 and a film magazine 3. In FIG. 1, the film magazine 3 is mounted on the camera housing 2. The magazine may however be removed, for example, in order to change to a different magazine or in order to change film in the magazine.

Figure 2:
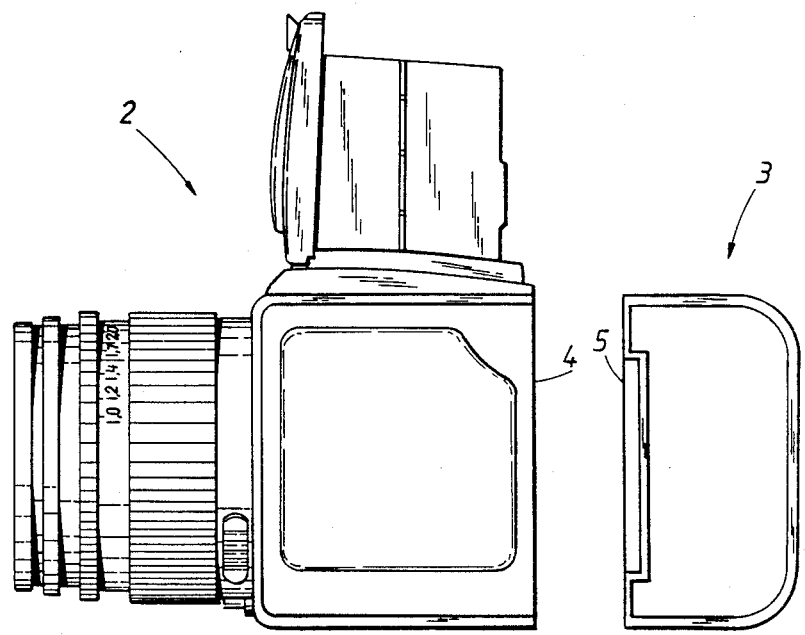
FIG. 2 is a side view of a camera housing.
Figure 3:
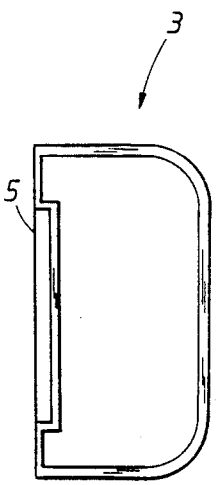
FIG. 3 is a side view of a film magazine which is mountable on the camera housing.

FIGS. 2 and 3 show the camera housing 2 and the film magazine 3 respectively, separately. A number of first electrical conductors (not shown) are arranged in the camera housing 2. The first electrical conductors are to be brought into electrical contact with corresponding second electrical conductors (not shown) which, in this illustrative embodiment, are provided in the film magazine 3. Such electrical conductors may for example be leads for conveying system voltage, a ground lead, or conductors for conveying digital or analog electrical signals.

The camera housing 2 and the film magazine 3 have respective mounting surfaces 4 and 5. The mounting surfaces 4, 5 are generally planar, at least in the region where the contact unit according to the invention is to be located. The contact unit according to the invention includes two main members, namely, a male contact member and a female contact member. These main members are illustrated and described in detail below.

The mounting surfaces 4, 5 are located in edge portions of the camera housing 2 and the film magazine 3 respectively. These edge portions surround the normally generally rectangular openings provided for the focal plane shutter and the film.

Figure 4:
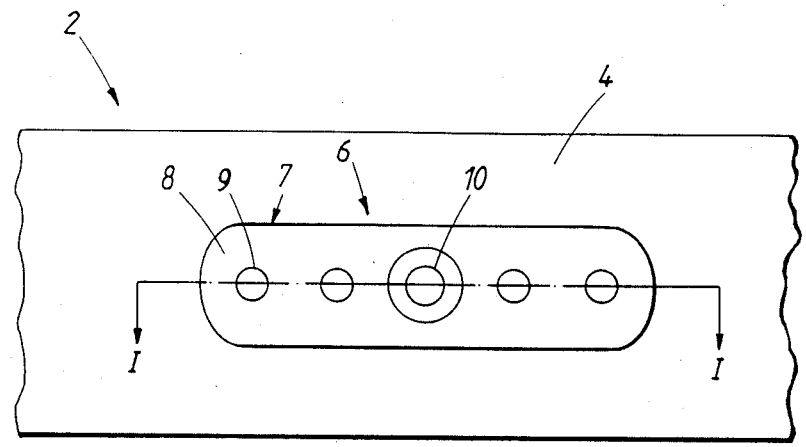
FIG. 4 shows a portion of a rear mounting surface of the camera housing.

FIG. 4 shows a portion of the mounting surface 4, namely, the portion in which a male contact member is located. The male contact member is designated generally by the reference numeral 6. The male contact member includes a outer supporting member 7 with a mainly planar outer supporting surface 8. The outer supporting member 7 comprises a number of male contact elements such as contact pins 9. In the illustrated example there are four contact pins; as will become apparent below, however, the contact unit according to the invention may comprise an arbitrary number of contacts.

FIG. 4 also shows the outermost end of a maneuvering pin 10. The construction and function of the maneuvering pin are described below.

Figure 5:
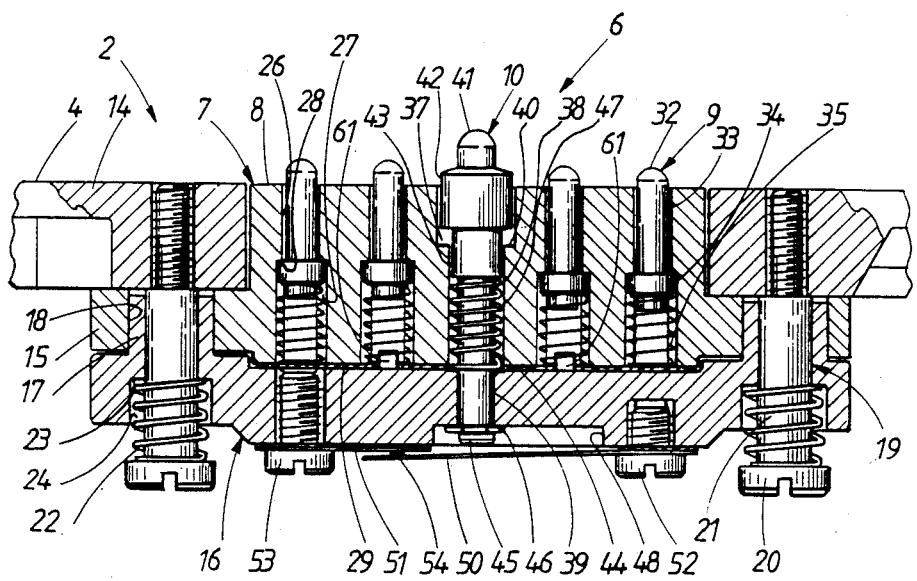
FIG. 5 is a sectional view along the line I—I in FIG. 4 of a male contact member in a free position.

FIG. 5 shows a section taken along the line I—I in FIG. 4 and shows the construction of the male contact member 6 in detail. As seen in FIG. 5, the mounting surface 4 is located in the outer surface of the edge portion 14 of the camera housing 2. Wing portions 15 of the outer supporting member 7 extend under the edge portion 14, viewed as in FIG. 5. The male contact member further comprises an inner supporting member 16, which has collar portions 17, which fit in guide holes 18 in the wing portions 15 of the outer supporting member 7. The inner supporting member 16 and the outer supporting member 7 are movably mounted on the edge portion 14 of the camera housing by means of guide screws 19, which pass through the collar portions 17 and guide holes 18 and are screwed into the edge portion 14. The centerlines of the guide screws 19 are mainly parallel with one another and perpendicular to the mounting surface 4. Each guide screw has a head 20 and a shaft 21. The inner diameter of each collar portion 17 corresponds to the diameter of the shaft 21 so that the inner supporting member 16 may move with good fit, that is, with minimal wobbling, by means of gliding up and down on the guide screws, but with so little friction that it is able to glide evenly and without jamming.

Main springs 22, preferrably helical springs, are mounted around the shafts 21 of the guide screws 19. The outer diameter of the main springs 22 is less than the diameter of the heads 20 of the guide screws. One end of each main spring 22 lies against the corresponding screw head 20, and the other end lies against a shoulder 23 which is formed by the inner delimiting surface of a corresponding main spring recess 24 in the inner supporting member 16. The main springs 22 are pretentioned so that they bias the inner supporting member 16, and therefore also the outer supporting member 7, upwards viewed as in FIG. 5, that is, they bias the supporting members 7 and 16 into the position shown in FIG. 5.

A contact pin hole, consisting of a outer bore 26 and an inner bore 27, which corresponds to and is concentric with the outer bore, is provided in the outer supporting member 8 for each of the contact pins 9. The diameter of the inner bore 27 is greater than the diameter of the outer bore 26 so that a shoulder is defined at the transition between the two.

A contact strip 29 is mounted between the outer supporting member 7 and the inner supporting member 16. Under each contact pin hole, on the surface which faces away from the contact pins (the upper surface viewed as in FIG. 5), the contact strip 29 has a contact surface consisting of a layer of an electrically conductive material. The contact strip 29 is described and shown more clearly below.

Each contact pin 9 has a preferrably rounded end 32, a mainly cylindrical shaft 33, and a generally cylindrical stopping collar 34. Each contact pin 9, including the stopping collar, is preferrably manufactured as a single element. The contact pins 9 are of an electrically conductive material such as brass and, in order to lessen the risk of corrosion, may be wholly or partially plated or coated with a layer of a precious metal such as gold.

A contact spring 35, preferrably a helical spring, is placed in each inner bore 27. The outer diameter of each contact spring 35 is approximately equal to the diameter of the corresponding inner bore in order to avoid wobbling when the contact spring is compressed. One end of the contact spring 35 lies against the stopping collar 34 of the corresponding contact pin 9. The other end lies against the contact surface 30 (see FIG. 9) of the contact strip 29, which is located at the corresponding inner bore. The contact springs 35 are manufactured of an electrically conductive material so that each contact pin 9 is electrically connected with the corresponding contact surface 30 on the contact strip 29 via the corresponding contact spring 35. The contact springs 35 are pretensioned so as to bias the contact pins upwards, that is, so that the stopping collars 34 are pressed against the corresponding shoulder 28.

By varying the depth of the inner bores 27, or by making the shafts 33 of the contact pins 9 unequally long, certain ones of the contact pins may be permitted to extend farther out from the outer supporting surface 8 than the others. In the illustrated exemplifying embodiment the two contact pins which are to the left of the maneuvering pin 10, viewed as in FIG. 5, thus extend farther out than the two contact pins which are to the right. This is not necessary and which of the contact pins, if any, which extend farther out may be chosen arbitrarily; unequal extension is, however, advantageous if one wishes to ensure that a chosen contact pin or pins will be brought into electrical contact with corresponding female contacts 12 earlier than the others when mounting the film magazine on the camera housing. This is further explained below.

A maneuvering pin hole consists of an outer bore 37, a middle bore 38, and an inner bore 39. The diameter of the outer bore 37 is greater than the diameter of the middle bore 38, whereby a shoulder 40 is defined; these bores are made in the outer supporting member 7. The inner bore 39 is made in the inner supporting member 16 with a diameter which is less than the diameter of the middle bore 38. The bores 37, 38 and 39 are preferrably coaxial.

The maneuvering pin 10 has a preferrably rounded end 41. It also has a head 42, a midsection 43, a shaft 44, and an inner end 45, all of which are preferrably cylindrical. The diameter of the head 42 is approximately equal to the diameter of the outer bore 37, but with enough of a gap or smooth enough contact to permit essentially unhindered axial movement. The diameter of the midsection 43 and the diameter of the shaft 44 are similarly approximately equal to the diameter of the middle bore 38 and the inner bore 39, respectively. A locking ring or washer 46, or some other suitable fastener, is secured at the inner end 45 of the maneuvering pin 10 in order to hold the maneuvering pin in the maneuvering pin hole.

A maneuvering pin spring 47, preferrably a helical spring, surrounds the shaft 44 of the maneuvering pin in the middle bore 38. The outer diameter of the maneuvering pin spring is approximately equal to the diameter of the middle bore; its inner diameter is approximately equal to the diameter of the shaft 44. The one end of the maneuvering pin spring lies against the midsection 43 of the maneuvering pin and the other end lies against the inner supporting member 16. The maneuvering pin spring is pretensioned so that it biasses the maneuvering pin 10 outwards (upwards viewed as in FIG. 5), but outward motion of the maneuvering pin is prevented when the locking washer 46 contacts the inner supporting member 16. An outermost position for the maneuvering pin is thereby defined. FIG. 5 shows the maneuvering pin in this outermost position.

One should observe that when the maneuvering pin is in the outermost position there is room between the head 42 of the maneuvering pin and the shoulder 40, and that the head 42 of the maneuvering pin extends out somewhat from the outer supporting surface 8, but not necessarily as much as the distance between the head 42 and the shoulder 40. One should also observe that the rounded end 41 of the maneuvering pin extends farther out from the male contact member than do the rounded ends 34 of the contact pins 9. The purpose of this feature is explained below.

FIG. 5 also shows that the inner end 45 of the maneuvering pin lies within a recess 48 when the maneuvering pin is in its outermost position.

A breaker contact, comprising a spring-return breaker contact member 50 and a fixed breaker contact member 51, is mounted on the inner supporting member 16 by means of mounting screws 52, 53. The spring-return breaker member 50 is most easily manufactured as a long, narrow, flat strip of an electrically conductive resilient metal with a hole for the mounting screw 52 at the one end and a contact boss or point 54 which sticks out at the upper end. The spring-return breaker member 50 extends under and across the recess 48, under the inner end 45 of the maneuvering pin 10, and partially overlaps the fixed breaker member 51. The fixed breaker member 51 is securely mounted on the inner supporting member 16 by means of mounting screws 53. In addition to normal fasteners, glue may for example also be used. When the maneuvering pin 10 is in its outermost position as shown in FIG. 5, the distance from its inner end 45 to the spring-return breaker member 50 is less than the distance by which the head 42 of the maneuvering pin extends out from the outer supporting surface 8.

FIG. 5 also shows that the inner supporting member 16 has a pair of mounting lugs 61, which extend upwards and within two of the inner bores 28. The mounting lugs make it easier to mount the contact strip 29 between the supporting members 7, 16 and hold it in place after mounting. Which of the inner bores they extend into may be chosen arbitrarily, and even the number of mounting lugs may of course be chosen differently.

The female contact member 11 of the film magazine 3 will now be described with reference to FIGS. 6 and 7. The female contact member includes a number of female contacts 12. In the illustrated example, each female contact 12 consists of a contact head 57 and a connecting portion 55; each female contact 12 is however preferrably manufactured as a single unit. The recess 13 is shown once again in FIG. 7. As was mentioned above, the female contacts 12 and the recess 13 are positioned in the mounting surface 5 such that when the film magazine 3 is mounted on the camera housing 2, the recess 13 is located immediately adjacent to the mounting pin 10 of the male contact member 6, and each of the female contacts 12 is located immediately adjacent to one and in line with of the pins 9. It is to be noted that the female contacts preferably do not have recessed portions into which the corresponding contact pins may extend, although this would be a fully permissible design choice according to the present invention.

Figure 6:
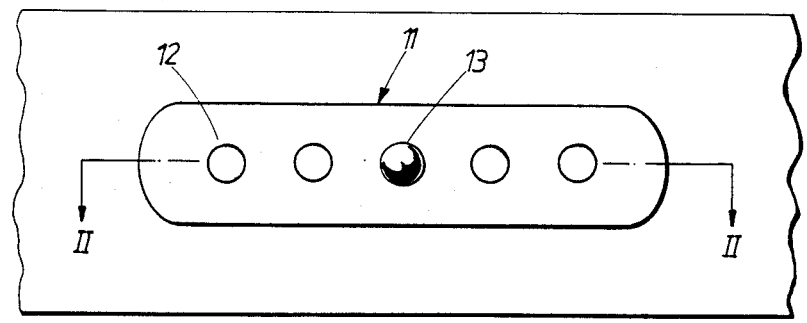
FIG. 6 shows a portion of a mounting surface of the film magazine.

FIG. 6 shows a portion of the mounting surface 5, in particular the portion in which a female contact member is located. The female contact member is as before designated generally with the reference numeral 11. The female contact member 11 further includes the recess 13, whose purpose is explained below.

Figure 7:
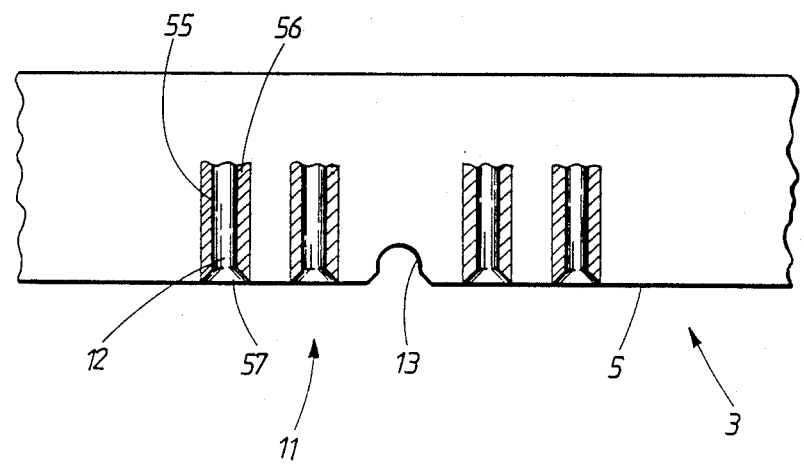
FIG. 7 is a sectional view along the line II—II in FIG. 6 of a female contact member.

FIG. 7 shows a sectional view of the female contact member 11 taken along the line II—II in FIG. 6. Electrically insulating sleeves 56 preferably surround each of the female contacts 12. Each insulating sleeve 56 is securely mounted in the mounting surface 5 of the film magazine. One should note that the insulating sleeves are not necessary if the mounting surface 5 itself is of an electrically insulating material. The contact heads 57 are preferably flush with the mounting surface 5.

Each of the above mentioned second electrical conductors, which are included in the film magazine, are connected, for example by means of soldering, with the connection portion 55 of the corresponding female contact 12.

Figure 8:
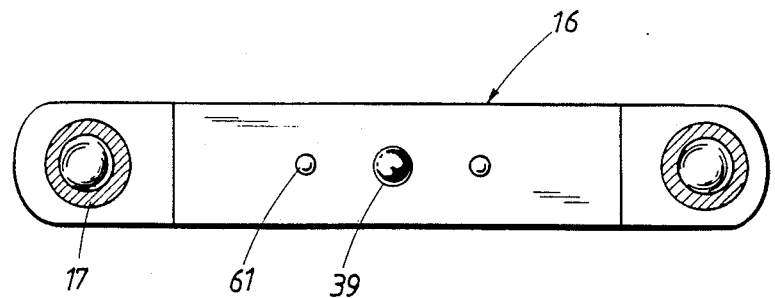
FIG. 8 is a front view of an inner supporting member, which is included in the male contact member.

FIG. 8 shows the inner supporting member 16, in which the collar portions 17 and the inner bore 39 are seen.

Figure 9:
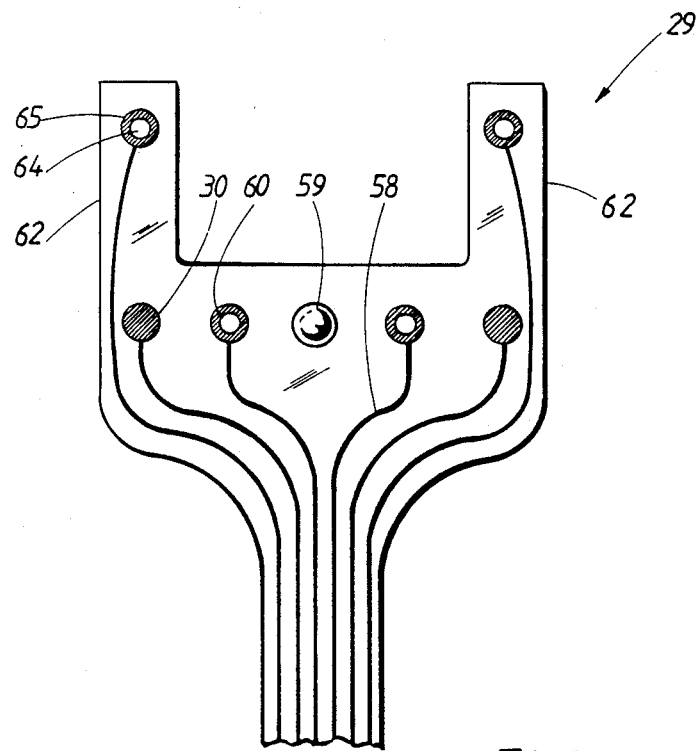
FIG. 9 illustrates a contact strip.

FIG. 9 shows an advantageous configuration of the contact strip 29, in which the contact surfaces 30 are illustrated. The contact strip 29 consists preferably of a mainly flat, flexible, electrically insulating strip of plastic, which contains or carries a plurality of electrical conductors 58. These conductors may be the same as the above mentioned first electrical conductors, or may lead to and be connected with them. Such "flexi-cables" are common in modern electronic constructions.

At the end of the contact strip which is mounted between the supporting members 7, 16, the strip has a central hole 59, whose diameter is preferably greater than the diameter of the shaft of the maneuvering pin so that the contact strip will not hinder the free movement of the maneuvering pin. At the same end the contact strip has mounting lug holes 60, which in the illustrated exemplifying embodiment, also pass through the two contact surfaces which are located closest to the central hole 59. The mounting lugs 61 pass through the mounting lug holes 60 when the contact strip is installed.

Electrical contact with the two members of the breaker contact is easily arranged by the configuration of the contact strip 29 shown in FIG. 9. Side portions 62 of the contact strip each include a conductor and are elongated so that when the contact strip is mounted between the supporting members 7, 16, these elongated side portions may be folded around the inner supporting member and connected respectively to the spring-return and the fixed breaker contact members 50 and 51. The mounting screws 52, 53 thereby pass preferably through holes 64 in the side portions 62 and corresponding contact surfaces 65 and clamp the breaker contact member against the contact surfaces 65. In the illustrated embodiment, the contact surfaces 65 are provided on the same side of the contact strip 29 as the contact surfaces 30. This makes it easier to manufacture the contact strip. It also means that when the elongated side portions are folded around the inner supporting member 16, the contact surfaces 65 become located on the underside, viewed as in FIG. 5.

The contact strip 29 may be arranged and shaped in many different ways, and the contact strip shown is only one example of a usable design. An alternative is to connect separate electrical conductors directly to the spring-return and fixed breaker contact members or to the corresponding mounting screws 52 and 53 of these members. The operation of the breaker contact will be described below.

The operation of the contact unit according to the present invention will now be described.

FIG. 5 shows the male contact member 6 in a free position, i.e., the position it assumes in the absence of external forces. In this free position the maneuvering pin 10 is in its outermost position and each of the contact pins 9 extends as far as possible out from the male contact member, thereby defining an outermost position for the contact pins as well. Under the influence of the main springs 22, the outer supporting member 7 and the inner supporting member 16 also assume an outermost position, in which the outer supporting surface 8 is mainly flush with the mounting surface 4.

Figure 10:
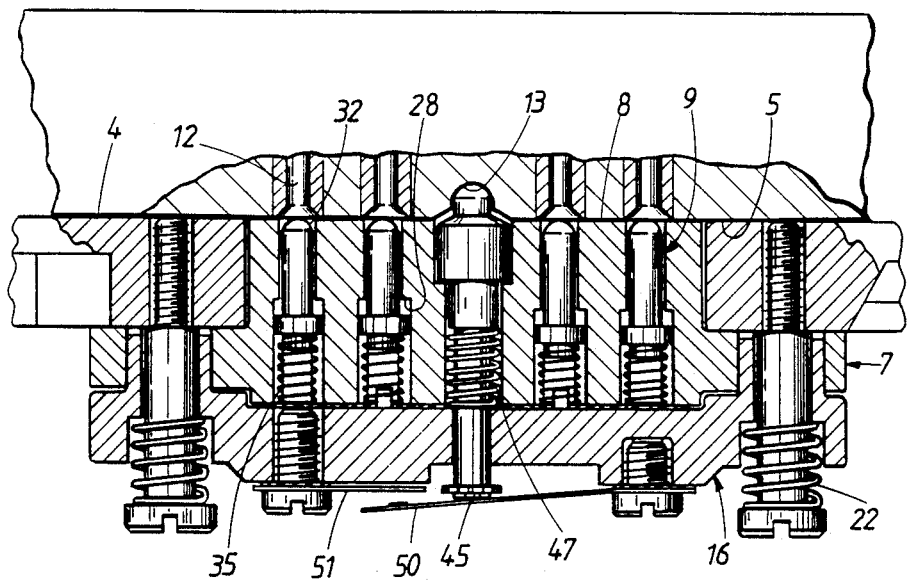
FIG. 10 is a sectional view of the contact unit in a mounted contact position.

When the film magazine 3 is mounted on the camera housing 2, the mounting surfaces 4 and 5 are brought towards each other so that the maneuvering pin 10 is approximately aligned with the recess 13, and the contact pins 9 are approximately aligned with the corresponding female contacts 12. The rounded end 32 of the maneuvering pin thereby enters into the recess 13 until the mounting surface 5 of the film magazine is approximately flush with the head 42 of the maneuvering pin. In this position the rounded ends 32 of the contact pins 9 lie against the contact heads 57 of the corresponding female contacts and are pressed somewhat inwards against the force of the contact springs 35. Continued pressing of the mounting surfaces 4, 5 against each other cause even the maneuvering pin 10 to be pressed inwards against the action of the maneuvering pin spring 47. The inner end 45 of the maneuvering pin thereby presses against the spring-return breaker contact member 50 so that its electrical contact with the fixed breaker contact member 51 is broken. FIG. 10 shows the contact unit in this position, which is referred to as the "mounted contact position".

In the mounted contact position the contact pins 9 are pressed inward so that their rounded ends 32 are generally flush with the outer supporting surface 8. The main springs 32 and their degree of pretensioning are chosen so that the total force with which they press the inner supporting member 16 outward is greater than or equal to the total force from all the contact springs 35, as well as from the maneuvering pin spring 47, with which the inner supporting member 16 is press inwards when the contact unit is in the mounted contact position. This prevents the male contact member from being pressed inward in the mounted contact position, although some inward pressing is allowable and possible without worsening the electrical contact between the contact pins and the female contacts.

In the mounted contact position, the rounded end 32 of each contact pin contacts the corresponding female contact 12. Since the contact pins are in electrical contact with the first electrical conductors via the springs 35, and the female contacts are in electrical contact with the second electrical conductors, as well as with the contact pin, the first and second electrical conductors are electrically connected with each other; this was of course one of the objects of the contact unit according to the present invention.

If one or more of the contact pins 9 extends farther out from the outer supporting surface 8 than the others, as has been described above, they will come into electrical contact with their corresponding female contacts earlier than the others when the mounting surfaces 4, 5 are brought towards each other. This means that electrical contact between them is also achieved earlier. This makes it possible to ensure good contact for, e.g., supply voltage conductors and the electrical ground, before contact is made between other conductors, e.g., conductors for carrying digital signals. Such an arrangement makes it possible to protect sensitive electronic components.

Figure 11:
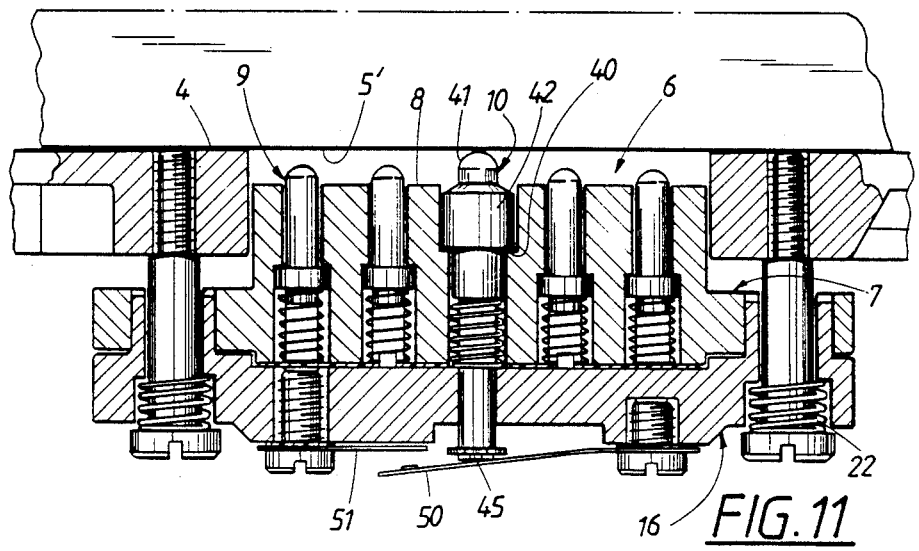
FIG. 11 is a sectional view of the contact unit mounted non-contact position.

With reference to FIG. 11, assume now that a film magazine without female contacts and without a recess corresponding to the recess 13 is to be mounted on the camera housing 2. This "non-electric" second film magazine has a mounting surface 5' which is mainly planar, at least in the region adjacent to the male contact member 6 when the film magazine is mounted on the camera housing.

Just as in the case described earlier with the film magazine 3, the second film magazine is mounted by bringing its mounting surface 5' against the mounting surface 4. Since the rounded end 41 of the maneuvering pin 10 extends farther out from the outer supporting surface 8 than do the contact pins 9, it will contact the mounting surface 5' first. Since the mounting surface 5' has no recess into which the rounded end 41 fits, the maneuvering pin 10 will be pressed inwards until the head 42 of the maneuvering pin seats against the shoulder 40. In this position the mounting surfaces 4, 5' are mainly parallel. Since the rounded end 41 still extends farther out from the outer supporting surface 8 than do the contact pins 9, the contact pins are not in physical contact with the second film magazine. Furthermore, electrical contact between the different members of the breaker contact is broken by the inner end 45 of the maneuvering pin 10 pressing against the spring-return breaker contact member 50 as was described above.

When the mounting surfaces 4, 5' are further pressed against each other, the entire male contact member 6, i.e., both the inner and outer supporting members as well as parts rigidly connected to them, is pressed inwards into the camera housing against the force of the main springs 22 until the second film magazine is mounted. The mounting surfaces 4, 5' thus lie against each other. This position is referred to as the "mounted non-contact position".

FIG. 11 shows the contact unit in the mounted non-contact position. One should especially note that the contact pins 9 do not touch the mounting surface 5' of the second film magazine in this position or, in fact, at any other instance during the mounting of the second film magazine onto the camera housing. This protects the pins against damage and unnecessary wear, which was one of the objects of the present invention.

When a film magazine—either with contacts such as the film magazine 3 or without contacts—is removed from the camera housing the male contact member 6 returns to the free position by means of a sequence of motions the opposite of that described above.

One should observe that the breaker contact is broken when mounting not only the contact-less film magazine, but also the film magazine 3 provided with female contacts and with the recess 13. The breaker contact is, however, closed in the free position, that is, when no film magazine is mounted. By means of the conductors which, in the example shown, are included in the contact strip 29 and which are electrically connected to the spring-return and fixed breaker contact 50 and 51 respectively, existing electronic circuitry in the camera housing can easily determine whether a film magazine is mounted on the camera housing.

One should however note that it is not absolutely necessary to include the breaker contact in the contact unit if the ability to determine whether a film magazine is mounted is not required. Furthermore, the breaker contact may be arranged in many ways other than the one described without departing from the scope of the present invention. The maneuvering pin 10 itself or some portion of it could for example serve as and replace the fixed breaker contact member 51, whereby a conductor would be connected to the maneuvering pin, possibly via the maneuvering pin spring 47 and an additional contact surface on the contact strip 29.

What is claimed is:

1. Electrical contact unit for electrically connecting a first main member, which has a first mounting surface, and a second main member, which has a second mounting surface and is mountable on the first main member,
    said first mounting surface and said second mounting surface lying against each other when the second main member is mounted on the first main member;
    said first main member including a male contact member, which has an outer surface and carries electrically conductive male contacts;
    maneuvering means, which extends outward from said outer surface and has an innermost position and an outermost position;
    guide means for slidably mounting the male contact member in the first main member for motion mainly perpendicular to the first mounting surface between an outer position and an inner position;
    when the male contact member is in the inner position, said outer surface being retracted relative to the first mounting surface, said male contacts being in a position of maximum extension, and said maneuvering means being in the innermost position and bearing against the second mounting surface;
    when the second main member is not mounted on the first main member, said male contact member being in the outer position, each male contact being in the position of maximum extension and the maneuvering means being in the outermost position.

2. Electrical contact unit as defined in claim 1, including main springs for biasing the male contact member into the outer position.

3. Electrical contact unit as defined in claim 1,
    said second main member including a female contact member, which includes an electrically conductive female contact for each male contact, and a recess;
    when said second main member is mounted on the first main member, said male contact member being located in the outer position, each male contact bearing against the corresponding female contact in a pressed-in position, and said maneuvering means being located in an intermediate position, in which the maneuvering means extends into the recess.

4. Electrical contact unit as defined in claim 3, said male contacts consisting of contact pins and said maneuvering means consisting of a maneuvering pin.

5. Electrical contact unit as defined in claim 4,
   each said contact pin being provided with a contact spring;
   said contact springs biassing the contact pins into the position of maximum extension; and
   said maneuvering pin being provided with a maneuvering pin spring for biassing the maneuvering pin into the outermost position.

6. Electrical contact unit as defined in claim 4,
   said male contact member including a breaker contact;
   said breaker contact comprising a spring-return breaker contact member and a fixed breaker contact member; and
   said breaker contact members being in electrical contact with each other when the maneuvering pin is in the outermost position, but electrically separated when the maneuvering pin is in either the intermediate position or the innermost position.

7. Electrical contact unit as defined in claim 1, in which chosen ones of the male contacts extend, in the position of maximum extension, farther out from the outer surface than the remaining male contacts.

8. Electrical contact unit as defined in claim 1, said male contact member comprising an outer supporting member and an inner supporting member, between which electrical connection means is mounted for electrically connecting each male contact with a corresponding conductor via contact surfaces.

9. Electrical contact unit as defined in claim 8, said connecting means consisting of a contact strip.

10. Electrical contact unit as defined in claim 1, in which the first main member is a camera housing and the second main member is a film magazine.

* * * * *